UNITED STATES PATENT OFFICE.

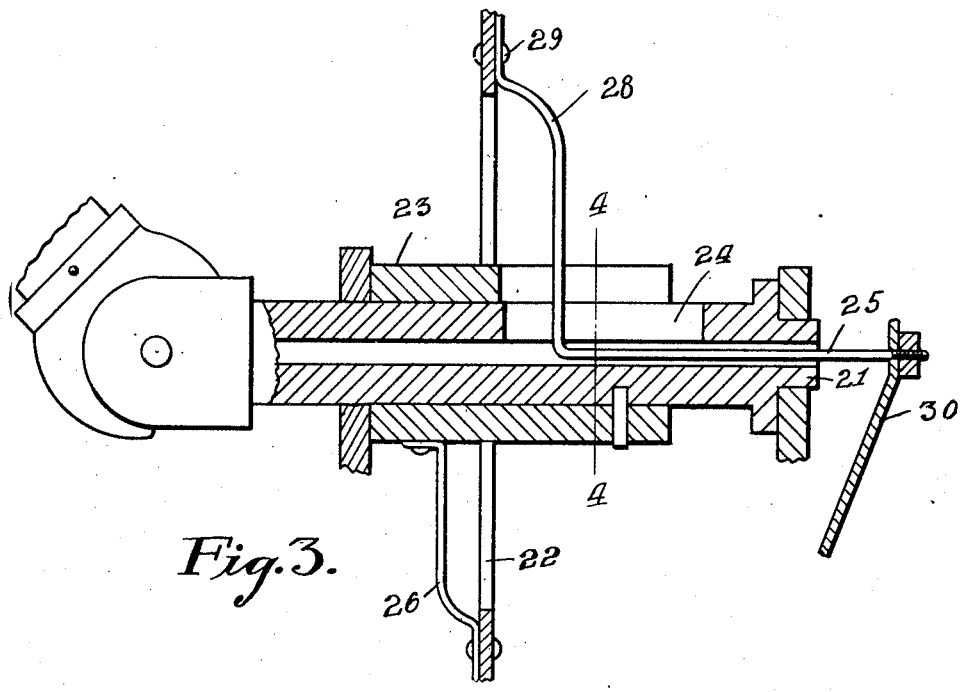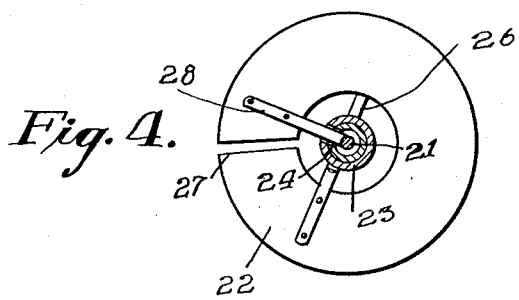

GRANVILLE M. HART AND JAMES EDGAR WALL, OF PLANO, TEXAS.

COTTON-CHOPPER.

1,343,777. Specification of Letters Patent. Patented June 15, 1920.

Application filed November 28, 1919. Serial No. 341,295.

*To all whom it may concern:*

Be it known that we, GRANVILLE M. HART and JAMES EDGAR WALL, citizens of the United States, residing at Plano, in the county of Collin, State of Texas, have invented a new and useful Cotton-Chopper, of which the following is a specification.

This invention relates to agricultural machines and more particularly to machines known as cotton choppers.

The primary object of the invention is to provide a cotton chopper of the rotary type, having novel means to permit the chopper to pass predetermined plants during the operation of the machine through a planted field.

A further object of the invention is to provide a device of this character which will be capable of adjustment, so that the distance between plants to be passed, by the chopper may be varied at the will of the operator.

A still further object of the invention is to provide a pivoted frame for supporting the chopping element, thus permitting the chopping element to be adjusted vertically with relation to the surface over which the device is operating, thus permitting the device to be readily moved into and out of operation.

With the foregoing and other objects in view which will appear as the description proceeds, the invention resides in the combination and arrangement of parts and in the details of construction hereinafter described and claimed it being understood that changes in the precise embodiment of the invention herein disclosed, may be made within the scope of what is claimed, without departing from the spirit of the invention.

Referring to the drawings:—

Fig. 3 illustrates a longitudinal sectional view through the chopping element and its support, and Fig. 4 is a sectional view taken on line 4—4 of Fig. 3.

Figure 1:
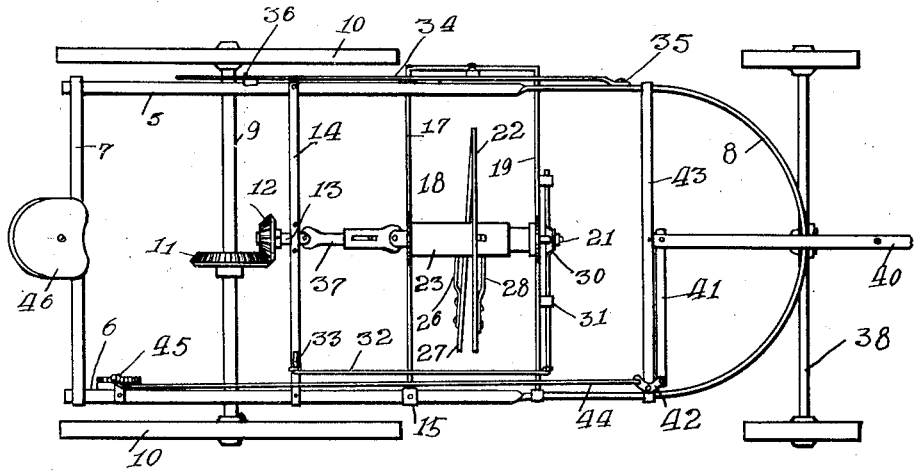
Figure 1 illustrates a plan view of a cotton chopper constructed in accordance with the present invention.
Figure 2:
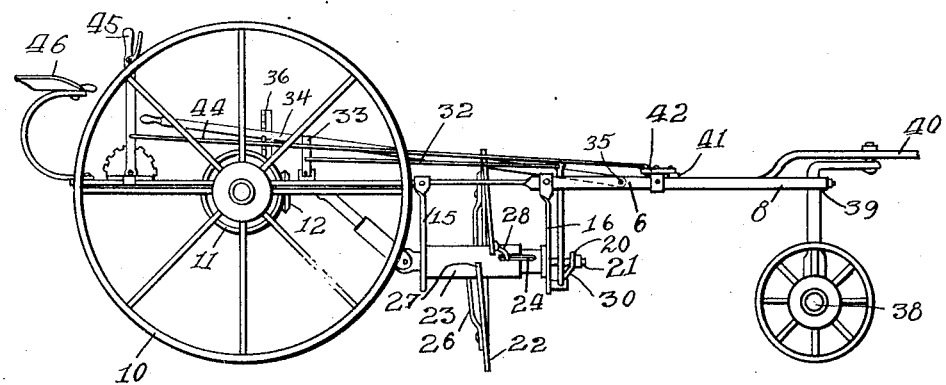
Fig. 2 illustrates a side elevational view of the same.
Figure 5:
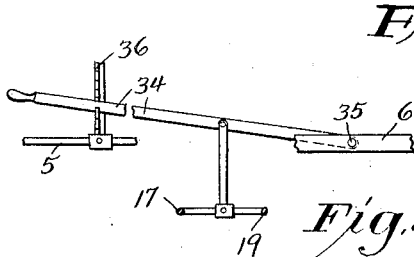
Fig. 5 illustrates a detail view of the operating lever which controls the movement of the auxiliary frame.

Referring to the drawings in detail, the frame is shown as including the side bars 5 and 6, and end bars 7, the forward bar 8 comprising a continuation of the side bars 5 and 6, the same being curved to eliminate shoulders, or irregular surfaces adjacent the forward portion of the machine, which would engage the plants under operation, to cause the same to be knocked down.

This frame is supported on the rear axle 9, which is keyed or otherwise secured to the bull wheels 10, so that movement of the wheels 10 produces a relative movement of the axle 9, which axle supports the beveled pinion 11, which is keyed thereto to move therewith, and as shown, this beveled pinion 11 meshes with a relatively small pinion 12 carried by one extremity of the stub shaft 13, which is journaled in a suitable bearing on the transversely extending bar 14, the ends of which bar 14 have connection with the side members 5 and 6 of the frame.

Depending arms 15 and 16 are arranged in spaced relation with each other and are secured to the side bar 6 of the frame, and provide bearings for supporting the pivoted blade supporting frame 17, which comprises spaced arms 18 and 19, which arms are provided with the upwardly extending bearings 20 for supporting the shaft 21 of the rotary blade, or chopping element 22. This chopping element 22 is provided with a hub 23, provided with a longitudinal slot 24, which slot 24 communicates with the bore 25, extending therethrough, the rotary blade or chopping element 22 having connection with the hub 23 by means of the bracket members 26.

The blade 22, is preferably circular in plan, and is provided with adjacent end portions 27, one of said end portions 27 is shown as having connection with the arm 28 as at 29, the relatively straight portion of the arm 28 passing through the bore 25 and extending to a point beyond the bearings 20, where the same has connection with the rocking arm 30 supported in the bearings 31, one end of the arm 30 extending upwardly and having connection with the operating rod 32, which in turn has one end connected with the foot lever 33, so that movement of the foot lever 33 produces a relative movement of one of the ends of the blade 22, to increase or diminish the size of the space between the ends 27.

An operating arm 34, has its forward end pivotally connected to the bar 5 of the frame as at 35, the opposite end thereof extending rearwardly to engage behind the arm 36 supported on the frame, which arm holds the operating arm 34 in various positions of adjustment to accomplish the vertical adjustment of the chopping blade 22, and its frame.

The stub shaft 13, has connection with the forward portion of the hub 23, through the medium of the shaft 37, so that movement of the pinion 12 causes a relative rotary movement of the cutting blade 22, regardless of the vertical adjustment thereof.

The forward portion of the frame is supported by the axle 38, on which operate the wheels 39. A vertical supporting rod being shown as having connection with the intermediate portion of the axle 38, the upper end of said rod extending at right angles to the axle 38, the portion of the rod directly under the right angled portion thereof being embraced by the bearings 39, to permit the front axle 38 to be shifted to cause the guiding of the machine.

An arm 40, is connected to the right angled portion of the supporting rod, adjacent the forward extremity thereof, the rear end of said arm 40 having pivotal connection with the arm 41, which has pivotal connection with one end of the bell crank lever 42, supported on the cross arm 43 forming a part of the frame. An operating rod 44 has connection with the bell crank lever, and extends rearwardly and has connection with the operating lever 45 which is disposed adjacent the seat 46, to enable the operator to have ready access thereto.

The forward end of the arm 40 is provided with means to permit the same to be connected to any suitable power mechanism, and it will thus be seen that when the power mechanism is moved to guide the machine, the front wheels of the machine move correspondingly, however, if the row of cotton plants over which the machine is operating, should be irregular, the operator, by movement of the lever 45 moves the front wheels of the machine to cause the same to take a proper position along the row.

In the operation of the device, the machine is positioned at one end of the row to be thinned by the machine, and the opening between the adjacent ends of the chopping disk is regulated, so that the space between the ends of the blade will fall opposite predetermined plants. It will thus be seen that when the device is moved to cause the rotation of the member 22, the cut out portion of the blade between the ends thereof contacts with the plants causing the same to be dislodged from the ground surface in which the same are planted.

Having thus described the invention, what we claim is:—

1. In a cotton chopper including a main frame, an auxiliary frame supported by the main frame, a hub supported by the auxiliary frame, said hub having a longitudinal bore and having a slot in communication with the bore, a shaft supported within the bore and having a slot registering with the slot of the hub, a chopping element having spaced ends, supported by the hub, an arm extending through the shaft and having a right angled portion secured to one of the ends of the cutting blades for moving one end of the cutting blade with relation to the opposite end thereof, means for rotating the cutting blade, and means for moving the arm.

2. In a cotton chopper including a main frame, an auxiliary frame pivotally supported by the main frame, and adapted to move vertically with relation thereto, a shaft supported by the auxiliary frame, a hub on the shaft, a rotary cutting blade having spaced ends supported on the hub, means extending through the shaft and hub and having connection with one end of the cutting blade for moving one end of the cutting blade with relation to the opposite end thereof, means for revolving the cutting blade, and means for moving the auxiliary frame with relation to the main frame.

In testimony that we claim the foregoing as our own, we have hereto affixed our signatures in the presence of two witnesses.

GRANVILLE M. HART.
J. EDGAR WALL.

Witnesses:
J. F. HARRINGTON,
A. W. KENNEDY.